Figure 1:
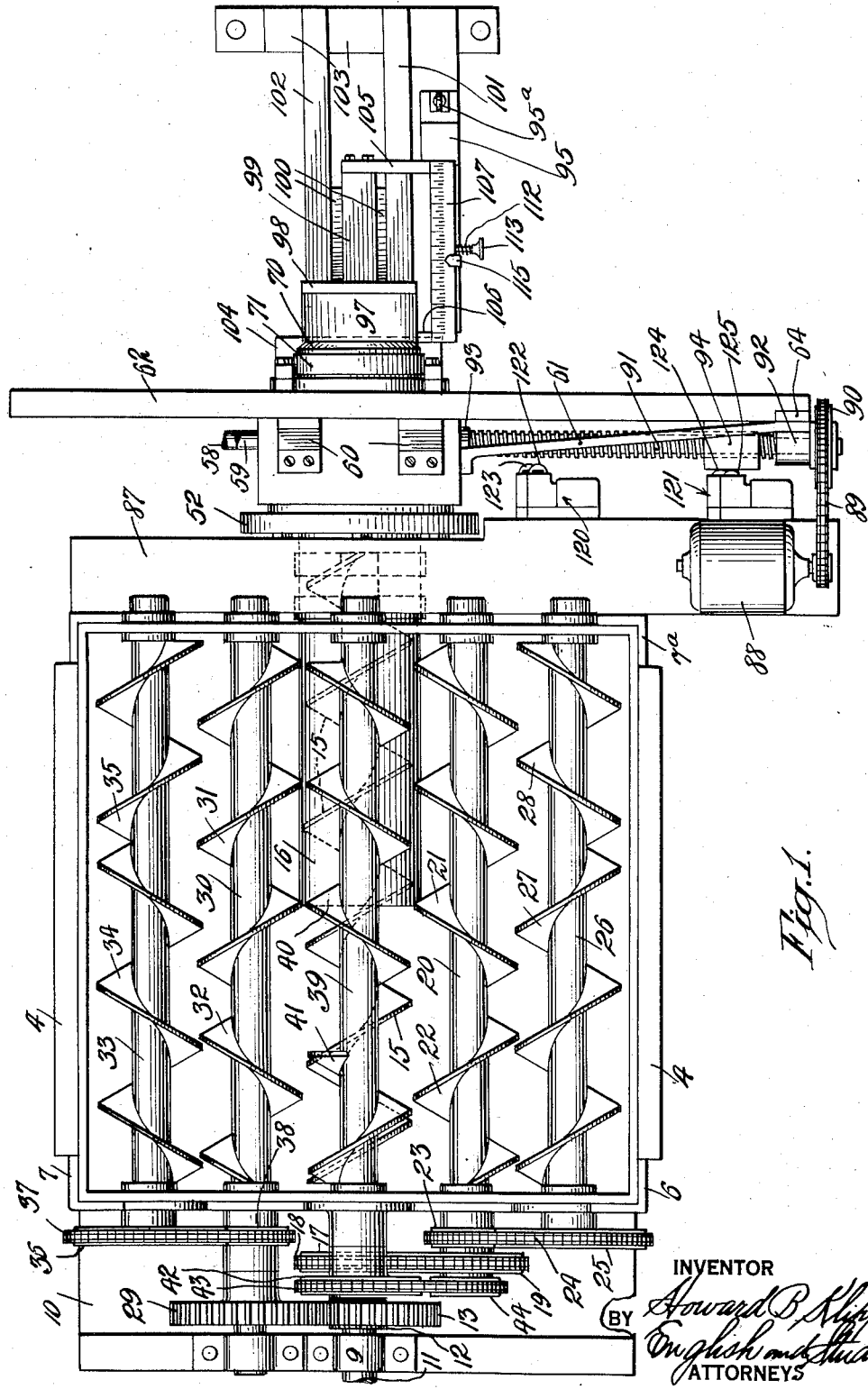

Oct. 16, 1934.  H. B. KLIPPEL  1,977,515
MACHINE FOR EXTRUDING PLASTIC MATERIALS
Filed June 24, 1931  5 Sheets-Sheet 1

INVENTOR
Howard B Klippel
BY English and Stundwell
ATTORNEYS

Oct. 16, 1934.                    H. B. KLIPPEL                    1,977,515
                      MACHINE FOR EXTRUDING PLASTIC MATERIALS
                           Filed June 24, 1931           5 Sheets-Sheet 2
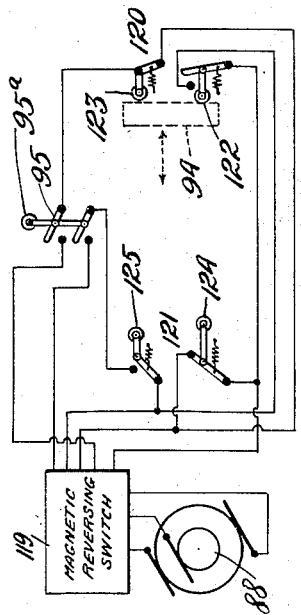
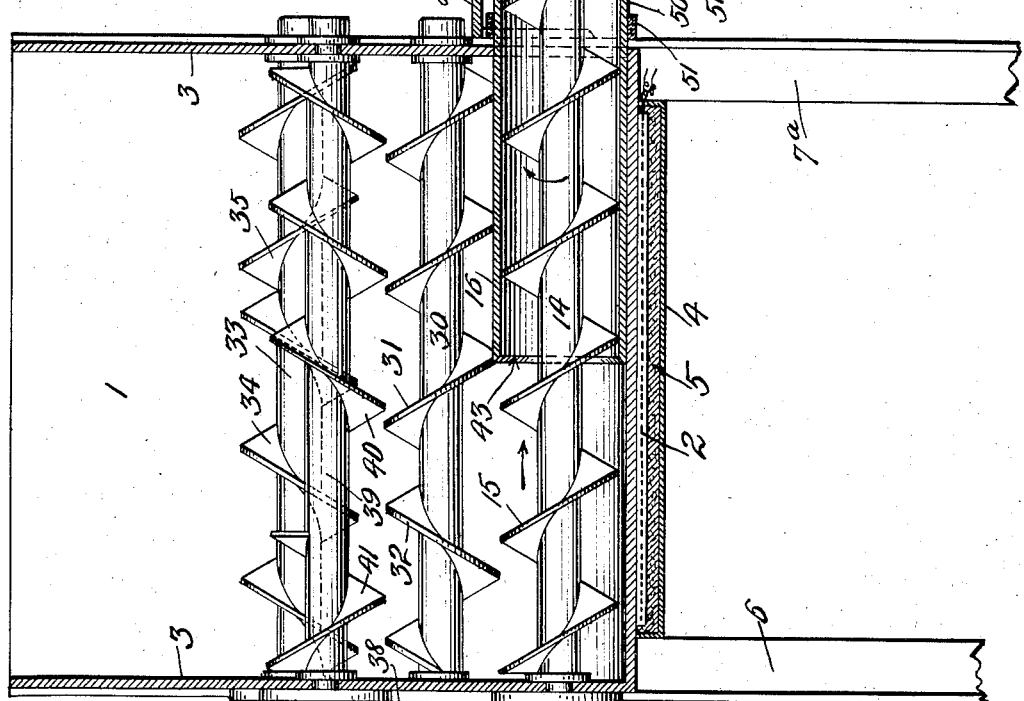
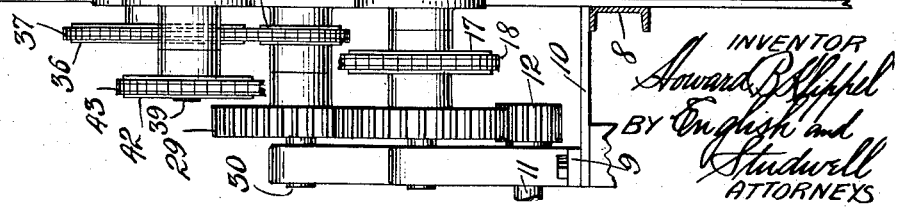
INVENTOR
Howard B. Klippel
BY English and
       Studwell
       ATTORNEYS

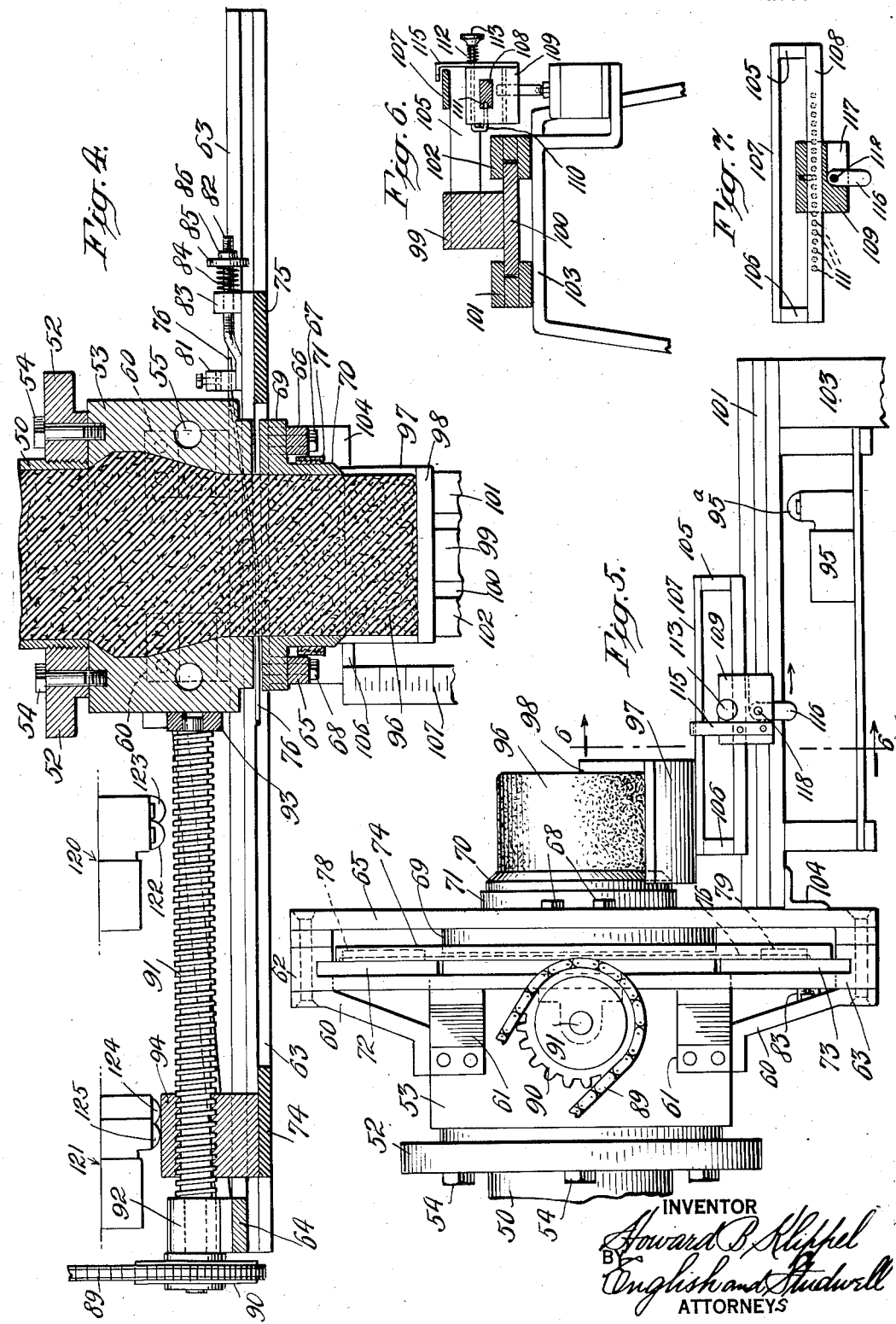

Oct. 16, 1934.  H. B. KLIPPEL  1,977,515
MACHINE FOR EXTRUDING PLASTIC MATERIALS
Filed June 24, 1931  5 Sheets-Sheet 4
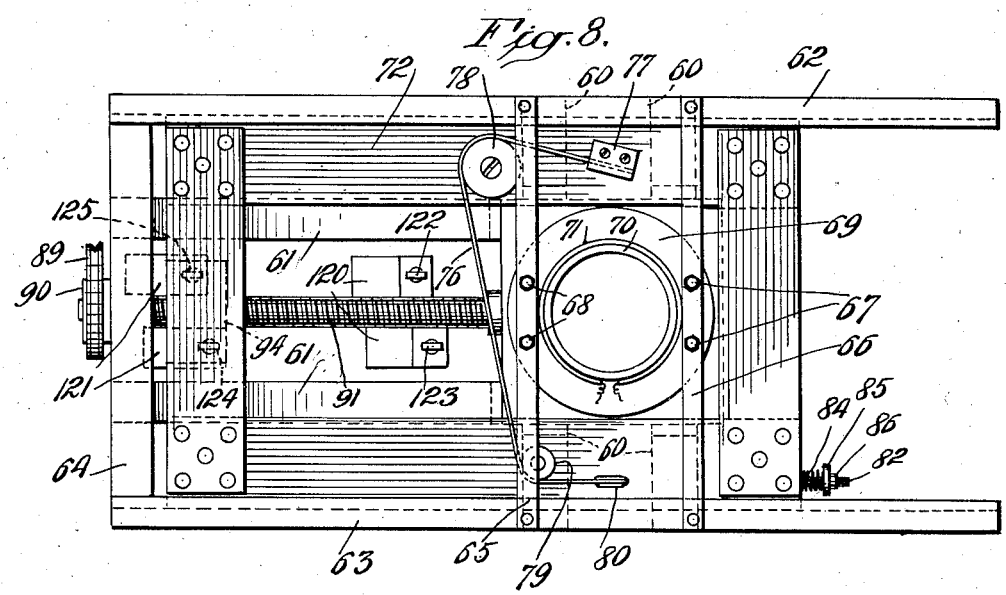
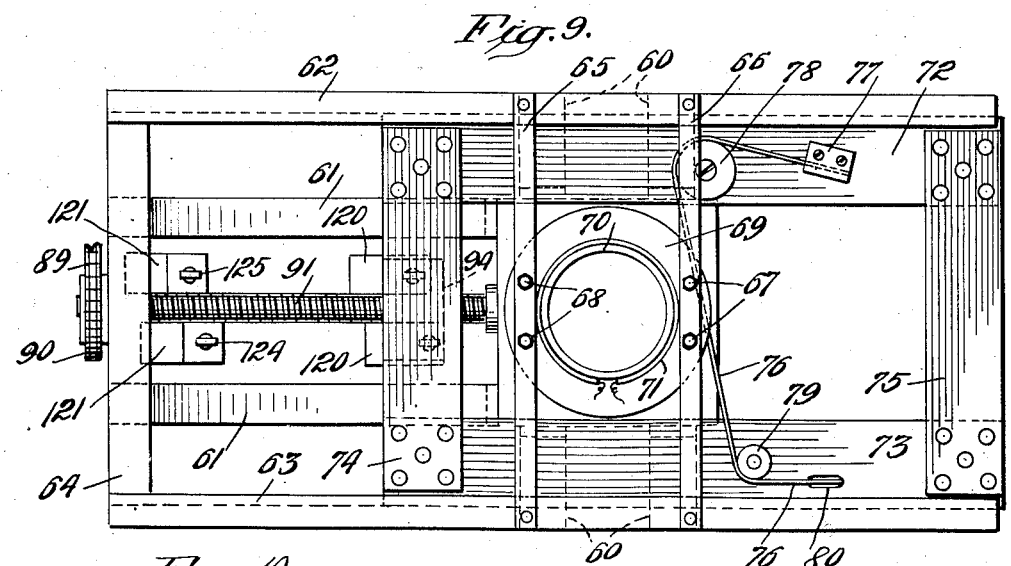
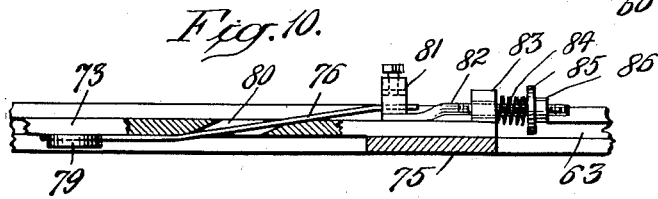
INVENTOR
Howard B. Klippel
BY
English and Studwell
ATTORNEYS Oct. 16, 1934. H. B. KLIPPEL 1,977,515
MACHINE FOR EXTRUDING PLASTIC MATERIALS
Filed June 24, 1931 5 Sheets-Sheet 5
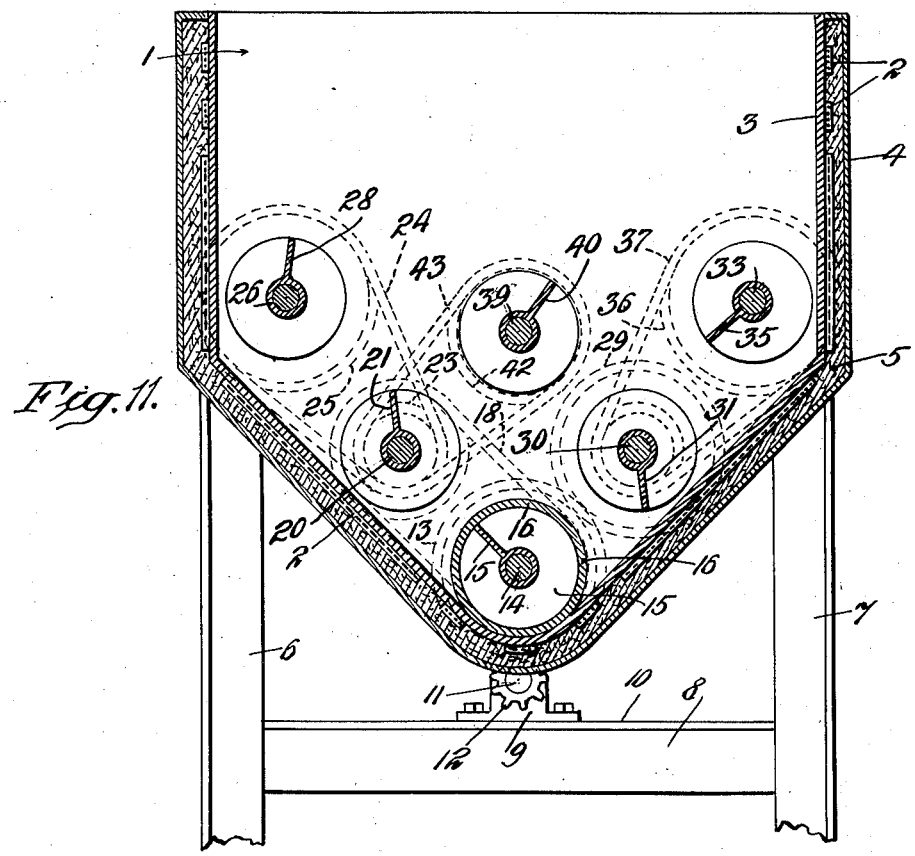
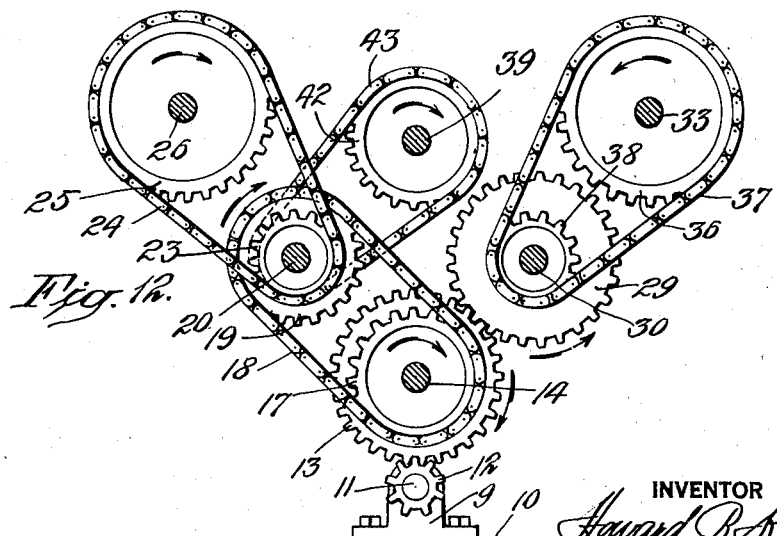
INVENTOR
Howard B Klippel
BY
English and Studwell
ATTORNEYS Patented Oct. 16, 1934

1,977,515

UNITED STATES PATENT OFFICE 1,977,515

MACHINE FOR EXTRUDING PLASTIC MATERIALS

Howard B. Klippel, Akron, Ohio, assignor, by mesne assignments, to The Richardson Company, Lockland, Ohio, a corporation of Ohio Application June 24, 1931, Serial No. 546,559

7 Claims. (Cl. 18—30)

This invention relates to an apparatus for extruding plastic substances, and more particularly heated materials, such as asphaltum or the like, and shaping and severing the same into convenient lengths. The object of the invention is to provide an apparatus of the character described which will act to extrude the plastic material and sever the extruded portions into predetermined and regulatable lengths of desired conformation, enabling such lengths to be readily handled while the substance is in its heated and plastic state whereby the same may be speedily molded into the finished articles which said severed sections are intended to form.

This and other objects of the invention are attained by a relatively simple and automatic means which serves to heat, to agitate and to compact the plastic mass and direct it towards an extruding tube through which it is forced, and thereafter severed into proper lengths for immediate or subsequent molding by presses or other apparatus which form it into a commercial article. Through the use of my invention, the plastic bodies, which are delivered for molding purposes, and which consist usually of a mixture of asphalt or pitch together with a fibrous material such as cotton linters or asbestos and a mineral filler such as silica, are compact and smooth and free from air bubbles and other defects, which would produce defective molded articles.

These objects, and other objects to be hereinafter set forth, are accomplished by the arrangement of parts set forth below and more particularly pointed out in the claims appended hereto.

The preferred form of the invention is illustrated in the accompanying drawings, in which Fig. 1 is a plan view of my improved machine for extruding the plastic materials and severing the same into lengths; Fig. 2 is a longitudinal sectional view of the same; Fig. 3 is an electrical diagram showing the switch arrangement for controlling the motor that operates the severing mechanism; Fig. 4 is a horizontal sectional view through the extruding head and severing mechanism; Fig. 5 is an end elevation of the mechanism disclosed in Fig. 4, viewing the same from the left-hand end of that figure; Fig. 6 is a sectional view on the line 6—6 of Fig. 5, looking in the direction of the arrows; Fig. 7 is a side elevation, partly in section, of the carriage, showing the means for regulating the length of the sections of extruded and severed plastic material; Fig. 8 is a front elevation of the outer end of the extruding tube, showing the mechanism for severing the extruded plastic substance into lengths; Fig. 9 is a similar view of the mechanism disclosed in Fig. 8, with the severing means located at the opposite end of its stroke; Fig. 10 is a sectional view of a portion of the cutting frame, showing the anchorage for the end of the severing wire and the means for maintaining tension thereon; Fig. 11 is a transverse sectional view of the hopper for receiving the plastic substance and its contained agitating and feeding members; and Fig. 12 is a view disclosing the driving means for the spiral agitating and feeding members.

In the embodiment of my invention disclosed in the accompanying drawings, 1 indicates a hopper intended for the reception of the plastic substance, which may be asphaltum or some similar preparation or combination of ingredients, and which is maintained in its proper plastic state by the application of heat. The composition supplied to the hopper 1 is in a heated state, and for the purpose of maintaining it in such condition, the hopper is heated in any suitable manner as by electric heating elements 2, which are disposed between the inner metallic lining 3 and the spaced outer metallic covering 4 of the hopper and preferably arranged in contact with said inner lining as is clearly disclosed in Fig. 11. A suitable insulation 5 is packed between the inner lining and the outer covering of the hopper. A uniform temperature is maintained in the hopper by rheostat control, and a cover, not shown, is preferably provided for the hopper.

The hopper 1 is supported in any suitable manner such as by a frame having standards, several of which are shown at 6, 7 and 7a, and also having a cross-member 8. Said cross-member 8 supports a plate 10 upon which is secured a bearing 9 in which a shaft 11 is journalled. Said shaft 11 constitutes a power shaft and may extend from or be driven by an electric motor or other source of power. Said shaft 11 serves to drive a plurality of agitating elements located within the hopper as will be explained.

Fixed on the shaft 11 is a pinion 12 that meshes with and drives a gear 13 fixed on a shaft 14 that is located at the bottom of the hopper 1 and carries a continuous spiral propelling vane 15 that forces or extrudes the plastic substance through a tube 16 located at the bottom of the hopper 1 and having an end projecting out of the hopper. The shaft 14 also carries, externally of the hopper 1, a sprocket 17 which drives a chain 18 that extends over a sprocket 19 fixed on a shaft 20 that extends longitudinally through the hopper 1 and carries a pair of oppositely disposed spiral mixing vanes 21 and 22, as is clearly shown in Figure 1. Fixed on the shaft 20 is a smaller sprocket 23 which drives a chain 24 that extends about and drives a sprocket 25 secured on a shaft 26 which extends through the hopper 1, similarly to the shafts 14 and 20 and parallel thereto. Said shaft 26 carries a pair of oppositely disposed spiral vanes 27 and 28 (see Fig. 1).

The gear 13 mounted on the shaft 14 meshes with and drives a similar gear 29 that is fixed upon a shaft 30 which extends through the hopper in a manner similar to the shafts 14, 20 and 26, and said shaft 30 is provided with a pair of oppositely disposed spiral vanes 31 and 32. A similar shaft 33 carries a pair of oppositely disposed spiral vanes 34 and 35. Said shaft 33 carries a sprocket 36 that is driven by a chain 37 extending from a smaller sprocket 38 fixed on the shaft 30. Also located within the hopper is another shaft 39 which carries a pair of oppositely disposed spiral vanes 40 and 41, said shaft carrying a sprocket 42 that is driven by a chain 43 that extends from a sprocket 44 carried on the shaft 20.

It will be seen from the foregoing, that the plastic mixture when placed within the hopper 1, is agitated, compacted and directed toward the bottom of the hopper and particularly toward the inner mouth 43 of the extruding tube 16, that is clearly disclosed in Fig. 2. This compacting and massing of the plastic mixture and its direction toward the mouth of the extruding tube is facilitated by the spiral vanes located on the rotating shafts 20, 26, 30, 33 and 39. As previously explained, each of these shafts carries a pair of oppositely disposed spiral vanes, the action thereof on the plastic substance being such that the same is directed inwardly from the opposite ends of the hopper and directed downwardly toward the bottom of the hopper where it is propelled outwardly through the extruding tube 16 by the action of the continuous spiral propelling vane 15 carried on the propelling shaft 14, a portion of which, together with the vane 15 carried thereby, is located within the extruding tube 16. With the type of hopper and feeding means herein disclosed, additional plastic material can be added to the hopper by quickly and easily dumping it therein at any time. The spiral vanes which compact and direct the plastic stock to the bottom of the hopper are so designed that they never permit the plastic stock to adhere to the sides of the hopper nor arch or bridge the hopper. These vanes steadily operate to continuously force the plastic stock downward and consequently prevent the collection of the stock in any part of the hopper where it might dry out and result in the production of a defective product.

A portion of the tube 16 projects outside of the hopper as shown at 50, and this extended portion of the tube is heated by suitable electric heating elements 51 which are arranged circumferentially about the outer surface of this extended portion 50 of the tube. The outer end of the extended portion 50 of the tube is threaded to receive an annulus 52 which receives and supports a heated extruding head 53, the same being secured to the annulus by the bolts 54. Said head 53 is hollowed as at 55 to enable it to be heated by steam or the like which may enter and pass out through the pipes 58 and 59 respectively. The head 53 is provided with an internal bore of varying diameter which is located in registration with the tube opening and forms a continuation of the same. It will be noted that the bore of the extruding head is increased in diameter as at 56 and that the same is contracted as at 57 to a diameter substantially similar to that of the inside of the extruding tube 16. Radial arms 60 and 61 extend from the head 53 and are secured to and support a fixed frame that consists of a pair of spaced longitudinal members 62 and 63 which are connected together at one of their ends by an end piece 64. These longitudinal frame members 62 and 63 are also connected by a spaced pair of brace members 65 and 66 which are bolted as at 67 and 68, respectively, to the circumferential flange 69 provided on an annulus or extruding spout 70 that is held in registration with the bore in, but slightly spaced from, the end of the head 53, to permit a cutting instrumentality to pass between the outer end of the head 53 and the inner end of the annulus 70 to sever a section of plastic material therebetween. An electric heating element 71 is carried circumferentially about the outer face of the annulus 70 to maintain the sections of plastic substance that pass therethrough in their proper heated consistency.

The longitudinal fixed frame members 62 and 63 are channelled to receive and permit of sliding movement on the part of a cutting frame that consists primarily of upper and lower bars 72 and 73 and end members 74 and 75 connecting the same. Said frame carries a cutting member 76 which consists of a taut wire that is anchored at one end as at 77 to the cutting frame member 72. Said wire 76 extends over a roller 78 also mounted on the face of the frame member 72 and thence extends downwardly across the face of the cutting frame at a slight angle, to the other frame member 73 where it passes over a smaller roller 79. From said roller 79, the wire 76 passes through a diagonally formed opening 80 in the member 73 to the rear of the same member where it is clamped in a bracket 81 that is formed on a threaded rod 82 that slides in a lug 83 fixed on the frame member 73. This threaded rod 82 extends beyond the lug 83 and is surrounded by a coil spring 84 that abuts against the lug 83 and has its opposite end bearing against a washer 85 provided on the rod 82. A nut 86 threaded on the rod 82, serves to adjustably maintain the tension of the spring which acts to suitably hold the wire 76 under constant tension to enable the same to sever the plastic substance on movements of the wire-carrying frame to either of the two positions shown in Figures 8 and 9 of the drawings.

The frame carrying the cutting wire just described, and which I herein term the "cutting frame", is adapted to be reciprocated so that the wire 76 is carried through the space located between the outer end of the head 53 and the inner end of the annulus or spout 70, and said wire acts to sever the plastic substance at that point each time that it is moved through the space just referred to. The means for reciprocating the cutting frame to secure the above-mentioned cutting operation thereby, will now be described.

Fixed to the hopper-supporting frame is a transverse supporting member 87 which acts to support an electric motor 88 that serves to reciprocate the cutting frame through co-operating mechanism. This motor 88 drives a chain 89 that extends over and drives a sprocket 90 fixed on a screw-shaft 91, said shaft being mounted at one of its ends in a bearing 92 mounted on the transverse end member 64 of the fixed frame within which the reciprocating cutting frame is mounted. Said screw-shaft 91 has its opposite end rotatably supported in a bearing 93 that is provided on the extruding head 53, as is clearly shown in Figure 4. The cross-member 74 on the cutting frame is provided with an internally threaded block 94 that is received on the screw-shaft 91. It will now be clear from the description just given, that by rotation of the screw-shaft 91 effected through the motor drive, the threaded block 94 and consequently the cutting frame to which it is attached, will be propelled longitudinally of the fixed frame members 62 and 63, until the cutting wire 76 has been passed across the end of the extruding head 53 to sever the plastic substance disposed therein. By reversing the operation of the motor, the cutting frame is caused to recede to its former position, acting to sever a second section of the plastic material that has been extruded during a pause in the movement of the cutting frame, which pause occurs at the end of its stroke.

The motor 88 which operates the cutting mechanism, is set in operation by a switch 95 to be hereafter described.

The extruded plastic material, which is shown at 96 is supported in an arcuate tray 97 which is provided with an upstanding end wall member 98 against which the end of the extruded material abuts. Said extruded material, acting against the end wall 98 on the supporting tray, serves to move a carriage of which said tray forms a part. This carriage, which is shown in detail in Figs. 5, 6 and 7, consists of a longitudinal member 99 upon which the arcuate tray 97 is mounted, said member 99 being secured upon a base plate 100 which is slidably mounted in grooved rails 101 and 102, which rails are supported on a frame 103 at their outer ends, and on an angle bracket 104 at their inner ends. The angle bracket 104 is supported by the members 65 and 66 of the stationary frame that surrounds the extrusion opening. At each of its opposite ends, the carriage member 99 is provided with a laterally extending arm 105, 106, which arms support a graduated scale plate 107, and also a perforated bar 108. A movable switch-operating member 109 in the form of a block is adjustable along the bar 108 and is arranged to be fixed thereon in any desired position by means of a finger 110 whose bent end is adapted to be inserted into any one of the perforations 111 with which said bar 108 is provided. Said finger 110 is held in engagement with the selected perforation by means of a spring 112 which surrounds the finger at its extended end and bears against the face of the block and has its opposite end bearing against a knob 113 that is provided on the outer end of the finger. An indicating pointer 115 is secured to the face of the block 109 and this pointer overlies the face of the graduated scale plate 107 as is clearly seen in Figs. 1 and 6 of the drawings.

The block 109 carries a dependent switch-operating finger 116 which is pivoted on a pin 118 within a slot 117 provided in the block. As the carriage which supports the extruded plastic substance 96 on its arcuate tray 97 is moved along on its support by the pressure of said extruded substance against the upstanding end wall 98 on said tray, the switch-operating finger 116 is brought into contact with the switch-button 95a which acts to close a circuit to place the motor 88 in operation to cause the extruded plastic substance to be severed. The switch 95 is a common form of switch which will operate a circuit to cause the motor 88 to run in either of two directions according to the setting thereof, which setting is secured by a conventional form of magnetic motor-reversing device diagrammatically indicated at 119 in Fig. 3. The means for ceasing operation of the motor 88 at the end of each cutting stroke, will now be described. Such means consists primarily of two pairs of switches, one pair being indicated at 120 and the other at 121. Each of these two pairs of switches is adapted to be contacted with and operated by a part on the cutting frame after the severance of a plastic section by the wire 76 on said frame has occurred. To permit of this operation of the switches, the same are positioned at spaced points on the frame member 87 so that the movable circuit-operating members on each switch are in position to be closed by the pressure of the block 94 thereon, as said block, as a part of the cutting frame, is moved to one or the other end of its stroke. Thus, when the cutting frame, consisting of the elements 72 to 75 inclusive, and associated parts, is in the position disclosed in Fig. 8, the block 94 is acting upon and operating the movable switch elements 124 and 125 on the pair of switches 121, whereas, when said frame has moved to the right of said figure and reaches the position shown in Fig. 9, the block 94 is in contact with the movable switch members 122 and 123 and has operated said switches. One switch of each pair, that is, those closed by operation of the respective switch members 122 and 124 acts, when closed by the block 94, to switch off the motor 88, to thus cease movement of the cutting frame. The other switch member of each pair, that is, the members 123 and 125, acts through the reversing mechanism 119 with which said switches are in circuit, to place the motor 88 in condition to reverse its direction of rotation immediately upon again being caused to operate by the closing of the switch 95 as heretofore described.

The operation of my improved machine will now be readily understood. The heated plastic composition is manually or otherwise supplied to the hopper 1 in quantity sufficient to keep the mass therein constant as long as the machine is in operation. While not shown, a cover may be provided for the hopper in order to retain uniform heat in the plastic mass. The spiral vanes rotating within the hopper tend to agitate the plastic mass therein, and the action of these vanes serves to prevent arching in the mass or the formation of air bubbles and gas, which would tend to result in weakness or flaws in the finished molded article. The arrangement of said spiral vanes is such that the same tend to work the plastic mass toward the center of the hopper and down to the bottom of the hopper where it is forced by the spiral propelling vane 15 out through the extruding tube 16. The feeding operation of the plastic mass continues as long as the various spirals are in operation and the hopper contains stock.

The mass that is fed as above described, continues out through the extended end 50 of the tube 16, being constantly heated the while by the heating elements 51, until it reaches the widened bore 56 where it expands slightly to fill said bore, being then contracted to pass out through the narrow portion 57 of said bore and finally out through the annulus or extrusion spout 70. That portion of the plastic mass 96 that has been extruded is received upon the arcuate tray 97 and the end of the said extruded mass abuts against the upstanding end wall 98 on said tray, and as the extrusion continues, the carriage on which said tray is mounted, is moved along on its rails 101 and 102 until the pendent switch-operating finger 116 acts as a cam upon the switch member 95a, causing said switch to close circuit to the motor 88 to set said motor in operation. If at the time this occurs, the cutting frame is in the position disclosed in Fig. 8, the motor will operate to drive said frame to the right of said figure, or in other words, to the position shown in Fig. 9. During such movement of the cutting frame, the severing wire 76 has been passed through the space between the outer face of the extruding head 53 and the inner face of the annulus 70 and has severed the extruded portion of the plastic material. The frame has then reached the position shown in Fig. 9, where the block 94 has closed the contacts 122 and 123 of the switches 120, thus ceasing motor operation and also placing the motor in position for reverse rotation.

The severed plastic section is then manually or otherwise removed and is usually immediately fed to a press for the manufacture of an article, such as a battery-box or the like, while still in its plastic, heated state. After the removal of the severed plastic section, the carriage 99, carrying the now empty tray 97 is manually slid along its rails 101 and 102 to bring it under the extruded material that is constantly being forced out of the annulus 70. This return movement of the carriage does not act upon the switch 95 in any way since on such return movement the switch finger 116 freely pivots up into the slot 117 provided in the block 109. The extruded plastic material again forces the carriage along on its rails until the switch 95 is again closed to once more operate the motor 88. At this time, the cutting frame is in the position where it was last left, that is, in the position shown in Fig. 9. To sever a plastic section it must therefore be shifted to the left of said figure. Since the motor has been placed in condition for reverse movement by the closing of the switch contact 123, said motor, when set in operation by the closing of the switch 95, now acts to cause the cutting frame to be moved to the left of Fig. 9 and to reach the position shown in Fig. 8. When it reaches this position it acts to shut off the motor and to place the same in readiness for reverse operation in its first direction of rotation.

The cutting operation is done accurately, each severed section being similar in shape and weight to the next. The length of the cut sections is readily regulatable by merely shifting the position of the block 109 on its supporting bar 108 and securing said bar in its position of adjustment by engagement of the finger 110 with any one of the selected perforations 111 in said bar. The graduated scale 107, indicating the weight or sizes of the various lengths represented by the settings of the block 109 on its support, aids in the obtaining of the desired severed length. Thus, when the block 109 is positioned well toward the left of its supporting bar, when viewed as in Fig. 5, the distance between the switch-operating finger 116 and the switch 95 is increased, with the result that the length of the severed section of plastic composition is increased. Reversely, when the finger 116 is positioned closer to the switch 95 as by shifting the block 109 to the right of Fig. 5, the length of the severed plastic sections will be decreased. It is thus evident that by the mere adjustment of the block 109 on its support, the size of the severed sections may be readily altered to suit different requirements.

I have herein shown the severed sections to be substantially cylindrical in shape, but it will be understood that this shape is optional since the shape of the extruded sections is merely dependent upon the internal shape of the bore element through which the plastic is expelled. Thus, by changing the shape of the opening in the annulus or spout 70 to suit any particular requirement, the shape of the extruded composition will conform thereto.

It will also be clear that through the various heating elements positioned at the different points in the apparatus, that is, about the hopper, about the part 50 of the extruding tube, within the head 53 and about the annulus 70, the plastic material is kept in a constant uniformly heated condition until extruded and severed. This condition, together with the formation of the severed sections into the most convenient shape and size for subsequent pressing or other manipulation, enables the most satisfactory of molded articles to be produced, and gives them an improved exterior appearance.

Having described one embodiment of my invention, it is obvious that the same is not to be restricted thereto, but is broad enough to cover all structures coming within the scope of the annexed claims.

What I claim is:—

1. A machine for extruding a heated plastic composition such as asphaltum or the like, provided with a heated hopper, a plurality of rotating spiral members located in said hopper, each of said rotating spiral members provided with a right hand and a left hand helical vane so as to direct the plastic substance toward the center of the hopper and toward the bottom of the same, a continuous spiral member operating at the bottom of the hopper, and a tube through which the plastic substance is forced by said continuous spiral member.

2. A machine of the class described provided with a heated hopper, a plurality of spiral members, each having left hand and right hand helical vanes mounted for rotation in said hopper so as to compact and direct a plastic substance toward the center of the hopper and toward the bottom of the same, a continuous spiral propelling member operating at the bottom of the hopper, a tube through which the plastic substance is forced by said spiral member, means for heating said tube, and a cutting instrumentality at the outer end of said tube for severing predetermined lengths of the plastic substance after the same has issued from the tube.

3. In a machine of the class described, a hopper, means in said hopper for compacting and directing a plastic material downward in the hopper, said means comprising a plurality of vaned shafts rotatably mounted in the hopper, several of said shafts each carrying a pair of vanes of opposite pitch which direct the plastic material inwardly from the opposite ends of the hopper, an extrusion tube connected to the hopper and means comprising a spiral member with a continuous helical vane for feeding the plastic material out of the tube.

4. In a machine of the class described, a hopper for receiving a plastic substance, feeding means in the hopper consisting of several rotatable vaned shafts, each of the shafts carrying two spiral vanes, one of which is of right hand pitch and begins at one end of the hopper and terminates at a distance from the other end of the hopper, the other vane being of left hand pitch and extending from the opposite end of the hopper to meet the inner termination of the first vane, said shafts being arranged to direct the plastic material toward the center of the hopper and downwardly toward the bottom of the hopper, an extrusion tube and means comprising a spiral member with a continuous helical vane for feeding the plastic substance out of the tube.

5. In a machine of the class described, a hopper for receiving a plastic substance, an opening leading from said hopper, feeding means comprising a spiral member with a continuous helical vane operative in the hopper for forcing the plastic substance continuously from the opening, means for directing the hopper contents to the feeding means comprising several vaned rotatable shafts located within the hopper above the feeding means, each of said shafts carrying a pair of vanes of opposite pitch to direct the hopper contents from the opposite ends of the hopper toward its center.

6. In a machine of the class described a hopper for receiving a plastic substance, parallel rotating shafts mounted in the hopper, each of said shafts being provided with a right hand and a left hand helical vane to direct the hopper contents toward the center of the hopper, an extrusion tube, and a shaft provided with a single, continuous spiral vane for forcing the hopper contents out of the tube.

7. In a machine of the class described, means for extruding a plastic, a movable carriage to receive the extruded plastic, abutment means on said carriage against which said extruded plastic presses so as to move said carriage, cut-off means movable transversely of the movement of said extruded plastic independently of said carriage, means for moving said cut-off means, and means for actuating said last mentioned means upon predetermined movement of said carriage.

HOWARD B. KLIPPEL.